(12) United States Patent  
Schmidt et al.

(10) Patent No.: US 8,532,686 B2  
(45) Date of Patent: Sep. 10, 2013

(54) SYSTEM AND METHOD FOR MANAGING SPECTRUM RESOURCES

(75) Inventors: Jeffrey C. Schmidt, Orlando, FL (US); Manish Shukla, Altamonte Springs, FL (US); Hrishikesh Gossain, Heathrow, FL (US)

(73) Assignee: Spectrum Bridge, Inc., Lake Mary, FL (US)

( * ) Notice: Subject to any disclaimer, the term of this patent is extended or adjusted under 35 U.S.C. 154(b) by 468 days.

(21) Appl. No.: 12/978,441

(22) Filed: Dec. 24, 2010

(65) Prior Publication Data

US 2012/0165059 A1     Jun. 28, 2012

(51) Int. Cl.  
*H04B 15/00*     (2006.01)
(52) U.S. Cl.  
USPC ........ 455/513; 455/509; 455/67.11; 455/507; 455/426.1; 370/328; 370/329; 370/338; 370/343; 370/332
(58) Field of Classification Search  
USPC ................ 455/513, 511, 509, 507, 500, 517, 455/67.11, 450–453, 422.1, 403, 550.1, 426.1, 455/426.2, 69, 423–425, 445, 512; 370/328, 370/329, 338, 343, 332  
See application file for complete search history.

(56) References Cited

U.S. PATENT DOCUMENTS

| | | | |
|---|---|---|---|
| 5,608,727 A | 3/1997 | Perreault et al. | |
| 2004/0087310 A1 | 5/2004 | Williamson et al. | |
| 2006/0031082 A1 | 2/2006 | Amaitis et al. | |
| 2006/0083205 A1 | 4/2006 | Buddhikot et al. | |
| 2006/0143111 A1 | 6/2006 | Mylet | |
| 2006/0182169 A1 | 8/2006 | Belge et al. | |
| 2006/0218392 A1 | 9/2006 | Johnston | |
| 2007/0025310 A1* | 2/2007 | Weng et al. | 370/338 |
| 2007/0274404 A1 | 11/2007 | Papandriopoulos et al. | |
| 2008/0052387 A1 | 2/2008 | Heinz et al. | |
| 2008/0108365 A1 | 5/2008 | Buddhikot et al. | |
| 2008/0221951 A1 | 9/2008 | Stanforth et al. | |
| 2008/0222019 A1 | 9/2008 | Stanforth et al. | |
| 2008/0222021 A1 | 9/2008 | Stanforth et al. | |
| 2009/0046625 A1 | 2/2009 | Diener et al. | |
| 2009/0116430 A1 | 5/2009 | Bonta et al. | |
| 2009/0197627 A1 | 8/2009 | Kuffner et al. | |
| 2010/0240407 A1* | 9/2010 | Park et al. | 455/512 |
| 2010/0254312 A1 | 10/2010 | Kennedy | |
| 2010/0261423 A1 | 10/2010 | Stanforth et al. | |

OTHER PUBLICATIONS

International Search Report and Written Opinion from corresponding International Application No. PCT/US11/64809.

(Continued)

*Primary Examiner* — Keith Ferguson  
(74) *Attorney, Agent, or Firm* — Renner, Otto, Boisselle & Sklar, LLP

(57) ABSTRACT

A central registration system provides channel maps of available spectrum to radio devices based on feedback and spectrum allocation policies. Each available channel in the channel map is given a score that is indicative of the quality of the channel for use by the particular radio device for which the channel map was generated. The quality score for each available channel may be based on the radio device's susceptibility to different types of interference and/or radio device's tolerance of the different types of potential interference.

20 Claims, 2 Drawing Sheets

(56) References Cited

OTHER PUBLICATIONS

Jones, Steven K. et al., "Initial Evaluation of the Performance of Prototype TV-Band White Space Devices", (2007), OET Report, FCC/OET 07-TR-1006, Jul. 2007.

47 C.F.R. 15.713, Jan. 4, 2012.

By the Commission, "Second Report and Order, Order on Reconsideration, and Second Further Notice of Proposed Rulemaking", Federal Communications Commission, 2004, FCC 04-167, WT Docket No. 00-230, pp. 1-180.

Kwerel, Evan et al., "A Proposal for a Rapid Transition to Market Allocation of Spectrum", Federal Communications Commission, 2002, OPP Working Paper No. 38, pp. 1-50, Nov. 2002.

Prabhu, Krish et al., "Time for Action" Genuine Ideas, 2002, [retrieved online Feb. 1, 2008], <http://www.genuineideas.com/ArticlesIndex/TimeForAction.htm>.

FCC 08-260, Second Report and Order and Memorandum Opinion and Order, Adopted Nov. 4, 2008 and Released Nov. 14, 2008.

"Digital Dividend: Cognitive Access, Consultation on License-Exempting Cognitive Devices using Interleaved Spectrum", Ofcom, Publication Date: Feb. 16, 2009.

U.S. Spectrum Management Policy: Agenda for the Future, 1991.

Radio Spectrum Management, Module 5 of ICT Regulation Toolkit, ITU, 2007.

\* cited by examiner

SYSTEM AND METHOD FOR MANAGING SPECTRUM RESOURCES

TECHNICAL FIELD OF THE INVENTION

The technology of the present disclosure relates generally to wireless communications infrastructure and, more particularly, to a system and method for managing spectrum resources that are used to support wireless communications.

BACKGROUND

Wireless networks and systems are becoming increasingly popular. But wireless communications are constrained due to a lack of available, interference free spectrum that may be used for reliable communications within a geographic area.

To enhance the availability and reliability of interference free spectrum, procedures that are governed by regulatory agencies (e.g., the Federal Communications Commission (FCC) in the United States) have been developed for allocating and governing spectrum use. In the U.S., for example, the FCC licenses spectrum in a primary spectrum market to Commission licensees. A secondary market exists for the Commission licensees to sublease spectrum for use by other parties.

In the U.S., some spectrum may be used without a license, but regulations on the spectrum may be imposed. For example, the FCC has eliminated analog television (TV) broadcasts in favor of digital TV broadcasts. This has freed spectrum channels for use by unlicensed radio systems to offer various services, such as mobile communications and Internet access. The freed spectrum is commonly referred to as TV whitespace. In the case of TV whitespace, the whitespace is comprised of unused TV spectrum between channel 2 and channel 51 (corresponding to 54 MHz to 698 MHz).

To avoid interference with digital TV broadcasts and other incumbent systems, such as wireless microphone systems, radios that use the TV whitespace are required to register and receive a channel map of available channels that may be used for the communications activity of the radio system. Current regulations require these radio systems to register every twenty-four hours. Also, for portable or mobile radios, if the radio moves into a new location, a new registration is required. Other regulations on the radios are present, such as transmitted power limits for different types of radios. Additional information regarding the regulation of TV whitespace may be found in FCC 08-260, Second Report and Order and Memorandum Opinion and Order, Adopted Nov. 4, 2008 and Released Nov. 14, 2008, the entirety of which is incorporated herein by reference. Similar proposals have been made in places other than the United States. For example, Ofcom in the United Kingdom has described access to certain spectrum by cognitive radios in "Digital Dividend: Cognitive—Access Consultation on License-Exempting Cognitive Devices Using Interleaved Spectrum," published Feb. 16, 2009.

SUMMARY

Although various regulatory agencies have identified parameters for the use of TV whitespaces, unlicensed and shared spectrum, there is room for improvement in the manner in which radio devices are informed of available spectrum. To improve use of spectrum resources, a central registration system provides channel maps of available spectrum to radio devices based on feedback and spectrum allocation policies. Each available channel in the channel map is given a score that is indicative of the quality of the channel for use by the particular radio device for which the channel map was generated. The quality score for each available channel may be based on the radio device's susceptibility to different types of interference, the radio device's tolerance of the different types of potential interference, and/or the radio device's proximity to other radio devices.

According to one aspect of the disclosure, a registration system for providing channel maps of available spectrum to radio devices includes an interface to communicate with the radio devices over a network; and a processor that executes a spectrum resource function that is stored in a memory. By execution of the spectrum resource function, the registration system is configured to: receive a registration request from a requesting one of the radio devices; determine channels that are available for use by the requesting radio device; score each determined channel as a weighted combination of factors, calculate the relative weights for each factor determined for the requesting radio device to account for at least one of susceptibility to different types of interference or tolerance of the different types of interference in the weighted combination; and transmit the determined channels and corresponding scores to the requesting radio device.

According to another aspect of the disclosure, a method of providing channel maps of available spectrum to radio devices includes receiving a registration request from a requesting one of the radio devices; determining channels that are available for use by the requesting radio device; scoring each determined channel as a weighted combination of factors, the relative weights for each factor determined for the requesting radio device to account for at least one of susceptibility to different types of interference or tolerance of the different types of interference in the weighted combination; and transmitting the determined channels and corresponding scores to the requesting radio device.

These and further features will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the scope of the claims appended hereto.

DETAILED DESCRIPTION OF EMBODIMENTS

Figure 1:
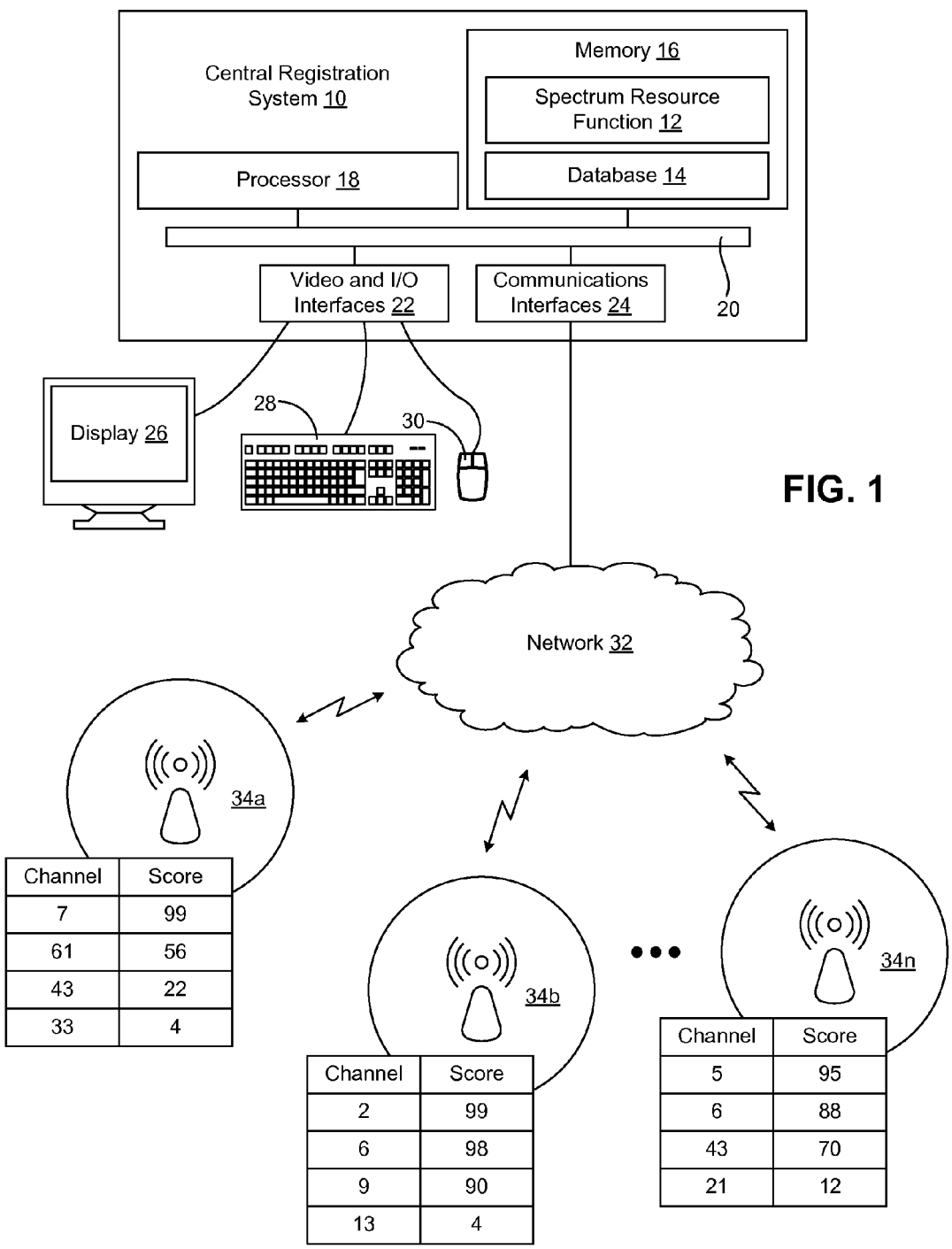
FIG. 1 is a schematic view of an exemplary system for managing spectrum resources.

Embodiments will now be described with reference to the drawings, wherein like reference numerals are used to refer to like elements throughout. It will be understood that the figures are not necessarily to scale. Features that are described and/or illustrated with respect to one embodiment may be used in the same way or in a similar way in one or more other embodiments and/or in combination with or instead of the features of the other embodiments.

A. INTRODUCTION

In the present document, embodiments are described primarily in the context of radio devices that register for and use spectrum whitespaces for wireless communications. The radio devices may be fixed in location, such as a wireless access point, or may be portable, such as a mobile telephone, a media player, a gaming device, a computer, a personal digital assistant (PDA), an electronic book reader, etc. It will be understood that each described radio device may be a radio system that includes one or more than one electronic device that is capable of wireless communications. In the case of a radio system that includes plural devices capable of wireless communications, a supervising device may register the entire radio system and select an operational channel, and each device in the system will be controlled to operate in accordance with the selected channel.

The whitespaces may be television whitespaces, in which case, the radio devices may be TV whitespace band radios (TVBDs). It will be appreciated, however, that the techniques described in this document may apply to any type of spectrum where useable spectrum is interleaved with spectrum used by incumbent, licensed or existing users, even if that spectrum is not referred to as whitespace by a governing regulatory entity. Therefore, even though aspects of the disclosure are described in the context of the use and allocation of TV whitespaces, there is clearly utility and application of the described techniques in any context where spectrum is allocated in an effort to provide quality of service and/or mitigate the effects of interference.

Aspects of the disclosed systems and methods are independent of the type or types of radio devices that may use spectrum. As such, the systems and methods may be applied in any operational context for wireless communications, and wireless communications are expressly intended to encompass unidirectional signal transmissions (e.g., broadcasting of a signal for receipt by a device without response) and to encompass bidirectional communications where devices engage in the exchange of signals. The methods and systems may be applied to dumb and/or cognitive radio devices. The methods and systems may be applied to licensed or unlicensed spectrum. Furthermore, the methods and systems are generic to modulation schemes, harmonic considerations, frequency bands or channels used by the radio devices, the type of data or information that is transmitted, how the radio devices use received information, and other similar communications considerations. Thus, the systems and methods have application in any suitable environment.

B. SYSTEM ARCHITECTURE

With reference to FIG. 1, illustrated is a schematic block diagram of a computer-implemented central registration system 10. The central registration system 10 is capable of executing computer applications (e.g., software programs) and may be configured to execute a spectrum resource function 12 and to store a database 14 that contains data regarding spectrum information that is used by the spectrum resource function 12.

In one embodiment, the spectrum resource function 12 is embodied as one or more computer programs (e.g., one or more software applications including compilations of executable code). The computer program(s) and/or database 14 may be stored on a non-transitory computer readable medium, such as a magnetic, optical or electronic memory 16 (e.g., hard disk, optical disk, flash memory, etc.). In the following description, ordered logical flows for the functionality of the spectrum resource function 12 are described. But it will be appreciated that the logical progression may be implemented in an object-oriented manner or in a state-driven manner.

To execute the spectrum resource function 12, the central registration system 10 may include one or more processors 18 used to execute instructions that carry out specified logic routines. The memory 16 may store data, logic routine instructions, computer programs, files, operating system instructions, and the like. As illustrated, the spectrum resource function 12 and the database 14 may be stored by the memory 16. The memory 16 may comprise several devices, including volatile and non-volatile memory components. Accordingly, the memory 16 may include, for example, random access memory (RAM) for acting as system memory, read-only memory (ROM), hard disks, floppy disks, optical disks (e.g., CDs and DVDs), tapes, flash devices and/or other memory components, plus associated drives, players and/or readers for the memory devices. The processor 18 and the components of the memory 16 may be coupled using a local interface 20. The local interface 20 may be, for example, a data bus with accompanying control bus, a network, or other subsystem.

The system 10 may have various video and input/output (I/O) interfaces 22 as well as one or more communications interfaces 24. The interfaces 22 may be used to operatively couple the system 10 to various peripherals, such as a display 26, a keyboard 28 a mouse 30, and other input and/or output devices (a microphone, a printer, a speaker, etc.). The communications interfaces 24 may include, for example, a modem and/or a network interface card. The communications interfaces 24 may enable the system 10 to send and receive data signals, voice signals, video signals, and the like to and from other computing devices via an external network 32. The external network 32 may include the Internet, a wide area network (WAN), a local area network (LAN), direct data link, or similar systems, and may allow information to be exchanged between the system 10 and radio devices 34.

In one embodiment, the system 10 may be configured as a server that executes the function 12 to host the below-described spectrum management functions. The spectrum management functions include providing channel registration information to qualified radio devices 34 so that the radio devices 34 may make use of spectrum for wireless communications. The function 12 may be considered an expert system for generating meaningful channel information for use by the radio devices 34 that increases the operational capacity of the corresponding spectrum and reduces interference among systems that use the spectrum. Also, while the registration process for the radio devices 34 may be fully automated, the function 12 may host an Internet-style website for the various corresponding parties to conduct initial enrollment with the system 10, conduct manual registration if needed, access various tools and reports supplied by the function 12, and so forth.

In the illustrated example, the radios devices 34 are labeled as radio devices 34a through 34n. The radio devices 34 each may be capable of executing a client function (e.g., a computer program that is stored on a non-transitory computer readable medium such as a magnetic, electronic, or optical memory) to implement the functions described in this document, including interacting with the central registration system 10 and controlling spectrum use of the radio device 34. For this purpose, the radio device 34 may include a processor and a memory, as well as appropriate transceiver circuitry for carrying out wireless communications.

The central registration system 10 collects spectrum usage information from various sources. The sources may include the radio devices 34, which are configured to provide feedback to the central registration system 10 in the form of radio capability and configuration information, channel selection, and the results of spectrum sensing and channel metrics collection. The sources also may include known spectrum users and systems that communicate with the central registration system 10, but do not seek channel map information from the central registration system 10. These sources may include licensed spectrum users and incumbent spectrum users (e.g., television stations, wireless microphone systems, cable head end systems, etc.) whose spectrum use results in the whitespaces.

C. SPECTRUM MANAGEMENT

Figure 2:
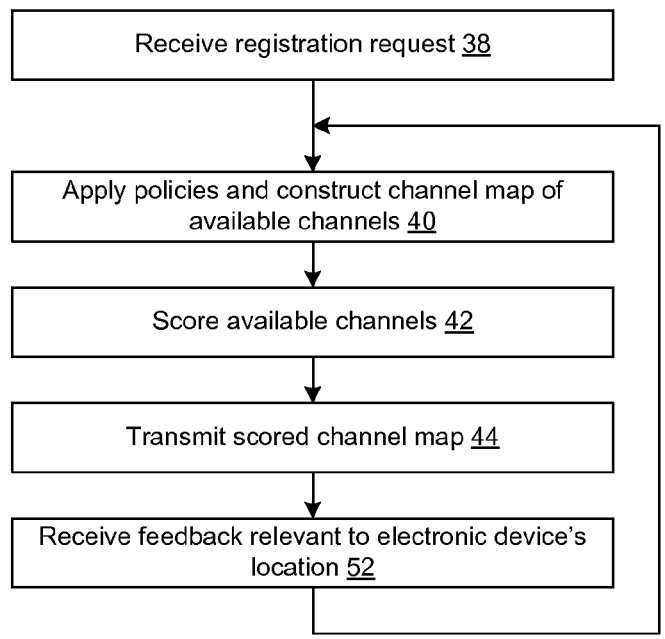
FIG. 2 is a flow diagram representing an exemplary method of managing spectrum resources carried out by a central registration system.

With additional reference to FIG. 2, illustrated are logical operations to implement exemplary methods of managing spectrum. The exemplary method may be carried out by executing an embodiment of the spectrum resource function 12, for example. Thus, the flow diagram may be thought of as depicting steps of a method carried out by the system 10. Although the flow chart shows a specific order of executing functional logic blocks, the order of executing the blocks may be changed relative to the order shown. Also, two or more blocks shown in succession may be executed concurrently or with partial concurrence. Furthermore, the registration process for one radio device 34 is described. The described functions may be repeated for plural radio devices 34.

Figure 3:
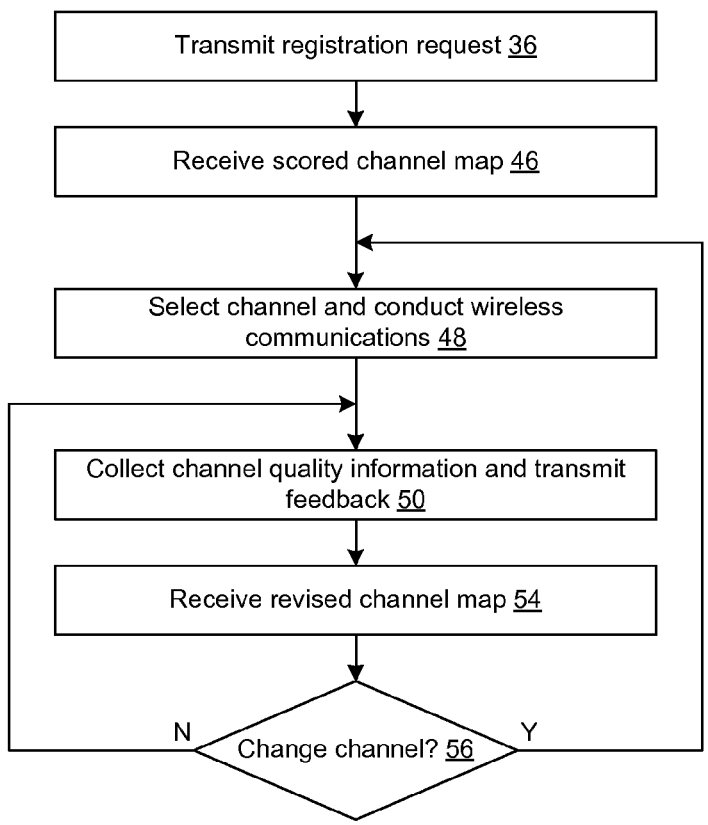
FIG. 3 is a flow diagram representing an exemplary method of registering for and using wireless spectrum.

The actions depicted in FIG. 2 may coordinate with actions of one of the radio devices 34. With additional reference to FIG. 3, illustrated are logical operations to implement of a method of gaining access to spectrum. The exemplary method may be carried out by executing a client function of the radio device 34. Thus, the flow diagram may be thought of as depicting steps of a method carried out by the radio device 34. Although the flow chart shows a specific order of executing functional logic blocks, the order of executing the blocks may be changed relative to the order shown. Also, two or more blocks shown in succession may be executed concurrently or with partial concurrence.

Since the actions taken by the radio device 34 and the central registration system 10 coordinate with one another, the flow charts of FIGS. 2 and 3 will be described in conjunction with one another. In block 36, the radio device 34 may transmit a registration request to the central registration system 10 to request receipt of a channel map containing the identities of channels that the radio device 34 may use for wireless communications. The available channels may not be contiguous in frequency. Also, the list of available channels may be accompanied with a quality score for each channel. The quality score is indicative of potential interference and/or level of use by other devices that the radio device 34 may encounter on the channel.

The registration request may be received by the central registration system 10 in block 38. The registration request may include information to identify the radio device 34, capabilities and/or preferences of radio device 34, and a location of the radio device. Some of the information may have been previously provided to the central registration system 10 during an initial enrollment of the radio device 34 so that the information need not be repeated in each registration request.

The identity information may include, for example, a regulatory agency identifier (e.g., in the U.S. an FCC id), a device serial number, contact information of a responsible person or entity (e.g., contact name, street and/or mailing address, electronic mail address, telephone number, etc.), radio type, and any other appropriate information.

The capabilities and/or preferences information may include, for example, channels over which the radio device 34 is configured to operate, an intended wireless application of the radio device 34, whether the radio device 34 will operate indoors or outdoors, protocols supported by the radio device 34, antenna height, transmit power capabilities, spectral mask, and any other performance-related characteristics of the radio device 34. The capabilities and/or preferences also may include preferences regarding the quality of a channel, such as tolerances for noise floor, congestion and proximity to other devices. In one embodiment, the quality preferences may be specified as weighting factors that are used to establish the quality score as a weighted sum using the weighting factors. In other embodiments the weighting factors may be determined by the central registration system 10 based on the radio identification, capabilities and location information. Alternatively, default weighting factors may be used for the radio type of the radio device 34.

Location information may be determined in any appropriate manner. Many radio devices are capable of determining their own location. For example, almost all mobile telephones and public safety radios sold since 2009 are equipped with global positioning system (GPS) location determining technology or other mechanisms for determining their location within approximately ten to fifty meters. As another example, radios that employ spectrum sharing, such as under FCC Order No. 04-186 concerning television white spaces, are required to be "location aware." Another location determination technique is to use a postal address, such as a street address or a postal code (e.g., in the United States a "zip+4" code may provide a sufficiently accurate location estimation). Another location determining technique may involve reverse triangulation using a channel map provided by the radio device 34. For instance, the radio device 34 may identity the channels on which the radio device 34 detects (or "sees") transmission activity and corresponding signal strengths. From matching this information to known service contours of radio devices, the central registration system 10 may estimate the location of the radio device 34.

In addition to the registration request, the radio device 34 may transmit feedback of spectrum use conditions in the location of the radio device 34. The feedback may be used in the determination of the quality scores as described below in greater detail. For instance, the radio device 34 may identity the channels on which the radio device 34 detects (or "sees") transmission activity and corresponding signal strengths. This data represents data of actual broadcasts by other radio systems and may be used to adjust calculated service contours (e.g., grade B contours) for those radio systems. Other exemplary feedback may include channel metrics, such as sensed noise on one or more channels and/or packet completion rate on one or more channels. Prior to receiving a channel map and selecting a channel for operation, the radio device 34 may not be able to provide certain feedback information, such as packet completion rate. But in other circumstances, such as when a radio device 34 sends a registration request because a current registration request is about to expire or because the radio device 34 is moving into a different location, then more feedback information may be available.

In one embodiment, the central registration system 10 may collect feedback from a large number of radio devices 34. For instance, as part of using the registration services of the central registration system 10, the radio devices 34 that use the central registration system 10 may be required to return feedback information indicative of channel quality during the time the radio devices 34 make use of spectrum from a channel map provided by the central registration system 10. The feedback may be provided on a periodic basis (e.g., every half hour, every hour, or some other time frame). The supply of feedback information from plural sources enables the central registration system 10 to gain information about the quality of many channels in many locations in order to formulate the quality scores that are described in greater detail below.

In block 40, the central registration system 10 may commence processing of the registration request. In block 40, the central registration system 10 may apply spectrum allocation policies to construct a channel map of channels that are available for use by the requesting radio device 34 in the location of the radio device 34. The channels that are available for use by the requesting radio device are determined without regarding to possible quality of the channel. Rather, the channels are determined by ascertaining whether the requesting radio device 34 is entitled to use the channel or is not entitled to use the channel by virtue of the spectrum allocation policies. The channels that the radio device is entitled to use will make up the channel map.

Following the exemplary context where the central registration system 10 provides channel maps for whitespaces, the central registration system 10 may apply protected area policies in determining which channels are available for use by the radio device 34. Incumbent radio systems that have priority of use over the requesting radio device 34 will each have a corresponding protected area in which other radio systems may not transmit radio signals for communications purposes. For each protected area in which the radio device 34 is located, the corresponding channel will not be available for use by the requesting radio device 34. All other channels may be considered available for use by the requesting radio device 34 and will be included in the channel map.

In one embodiment, the channel map may be further culled according to capabilities of the radio device 34. For example, the spectrum allocation policies also may include evaluating the available channels against the capabilities of the radio device 34 to determine if the radio device 34 is capable of the using each of the available channels. Therefore, in this embodiment, the channel map of available channels will include channels that are available for use and that the radio device 34 is capable of using.

In block 42, the central registration system 10 may establish a quality score for each channel in the channel map for the requesting radio device 34. The quality score for a channel may be thought of as a "usability score" for the channel as an indicator of how useable the channel is to the requesting radio device 34 without interference to which the radio device 34 is susceptible. The quality score may be based on two or more factors that may affect the requesting radio's wireless communication performance over the channel in question. The quantification of each factor may be based on combining all available information that is related to the factor and that is relevant to the location of the requesting radio device 34. Exemplary factors include congestion, proximity to other devices and noise floor. The factors may be quantified for the location of the requesting radio device 34 and for each available channel using the feedback provided by the requesting radio device 34 and the other radios devices 34 that have provided feedback to the central registration system 10. In some circumstances where there may be a lack of feedback information for the location of the requesting radio device 34, the requesting radio device 34 may be requested by the central registration system 10 to scan one or more identified channels and return results of the scan operation for use in the generation of the quality score.

Congestion may be quantified as a congestion score that is based on the spectrum or channels that are actually being used by the radio devices 34 in the network neighborhood of the requesting radio device 34. Congestion may be based on criteria such as one or more of contention for spectrum resources, packet completion rate, packet collision rate, number of co-located radio devices 34 that are operating on the same channel, number of co-located radio devices 34 that are operating on adjacent channels, etc. Using congestion in the determination of the quality score for the channel promotes physical separation between radios devices 34 that operate on the same channel or, in some embodiments, adjacent channels.

Proximity may be quantified as a proximity score based on the physical separation of radio devices 34 that operate on the same channel as the channel in question. Since different radio devices 34 may operate with different transmit power, different antenna heights, and varying other operational factors, proximity may be determined using considerations in addition to geographic distance between radio devices 34 as determined by the location information that is collected from each radio device 34. One or more path loss models (also referred to as propagation models) may be used to determine the amount of interference that each nearby radio device 34 may have on the requesting radio device 34. Therefore, proximity may be specified in terms of an interference amount based on the power level of signals present at the location of the requesting radio device 34 and originating from other radiators. Using proximity in the determination of the quality score promotes the minimization of radio devices 34 using the same channel in an overlapping manner. Therefore, depending on the number of available channels for a location and the number of radio devices 34 in the location, the proximity value may facilitate exclusive spectrum use by the radio devices 34 by distributing the radio devices 34 among the available channels.

Noise floor for the channel in question may be quantified as a noise floor score based on a noise floor measurement made by the requesting radio device 34 and/or other radio devices 34 that are operating in or near the location of the radio device 34. In another embodiment, a calculated approximation of noise floor may be made by the central registration system 10. In another embodiment, the measured noise floor value may be modified using a calculated approximation of noise floor. For instance, the influence from other transmitters (e.g., potential interference) may be calculated by aggregating the noise floor contribution generated by known radiators within a range that has the potential to yield interference to the requesting radio device 34. Depending on the type of radiators, this range may be measured in miles, tens of miles, or hundreds of miles, or may be infinite meaning that all known radiators are considered. One or more path loss models may be employed to determine the noise floor contribution from each radiator.

As indicated above, preference weights for the factors considered in generating the quality score for the requesting radio device 34 may be determined. In one embodiment, the preference weights may be supplied by the radio device 34. In other embodiments, the preference weights may be derived by the central registration system 10 based on the radio type, application and other operational considerations of the requesting radio device 10. In still other embodiments, a default set of preference weights may be used. The preference weights may be established to influence the quality score for each available channel based on the susceptibility to different types of interference and/or the tolerance of the radio device 34 to the different types of potential interference.

The preference weights may be normalized. For example, in the embodiment where the quality score is determined using noise floor, congestion and proximity, the preference weights satisfy equation 1, where $w_n$ is the preference weight for noise floor, $w_c$ is the preference weight for congestion, and $w_p$ is the preference weight for proximity.

$$w_n+w_c+w_p=1 \qquad \text{Eq. 1}$$

The quality score may be calculated as a function of the preference weights and scores for each considered factor. For example, in the embodiment where the quality score is determined using noise floor, congestion and proximity, the quality score for the channel in question may be determined using equation 2, where $F_N$ is a quality score for noise floor, $F_C$ is a quality score for congestion, and $F_P$ is a quality score for proximity.

$$\text{Channel Quality Score}=w_n F_N+w_c F_C+w_p F_P \qquad \text{Eq. 2}$$

The quality scores for the individual factors each may be on a scale, such as zero to one hundred. In this example, the value of $F_N$ may be from zero (representing a very high degree of noise) to one hundred (representing a very low degree of noise), the value of $F_C$ may be from zero (representing a very high degree of congestion) to one hundred (representing a very low degree of congestion), and the value of $F_P$ may be from zero (representing very proximate radios) to one hundred (representing very distant radios). In this manner, the weighted sum of the quality scores for the individual factors (or the channel quality score) will be on the scale with higher score representing better quality channels than lower scoring channels.

In block 44, the channel map of available channels and the scores for each available channel are transmitted to the requesting radio device 34. The channel map and scores are received by the radio device 34 in block 46.

FIG. 1 shows exemplary scored channel maps for each of the radio devices 34. In the illustrated embodiment, four available channels are shown for each radio device 34. It will be appreciated that the channel maps may contain less than or more than four channels and different radio devices 34 may have different length channel maps. In the illustrated embodiment, the quality scores for each channel are made on a scale of zero to one hundred, where one hundred represents the highest possible quality. In the illustration, the channels in the channel maps are ordered according to respective score. The channel maps may be transmitted in this ordered arrangement or in some other order (e.g., by channel number or corresponding frequency) and the radio device 34 may determined which channel has the highest quality from the quality scores. In another embodiment, the quality scores need not be transmitted as part of the channel map. Rather, the channels may be ordered according to score or the highest quality channel may be separately identified.

It is contemplated that radio devices will use the scores during channel selection. For example, in block 48, the requesting radio device 34 will select a channel from the channel map to carry out wireless communications. In one embodiment, the radio device 34 may be configured to select the channel from the channel map that has the score that represents the highest channel quality. Once a channel is selected, the radio device 34 may commence radio operations using the selected channel. As part of the feedback provided to the central registration system 10, the radio device may inform the central registration system 10 of which channel was selected.

In block 50, the radio device 34 may collect feedback information concerning channel quality and transmit the feedback information to the central registration system 10. The collection and transmission of feedback information may be made on a periodic basis or may be triggered by an event (e.g., detection of a new radio source or undesirable performance).

The feedback may be received by the central registration system 10 in block 52. The feedback may enter the knowledgebase of the central registration system 10 and may be used in generating quality scores when generating future scored channel maps.

Following block 52, the logical flow carried out by the central registration system 10 may return to block 42 to establish a revised scored channel map for the radio device 34 and transmit the revised scored channel map to the radio device 34. The revisions may be based on changes in channel availability by application of the policies in block 40 and/or based on changes in channel quality based on feedback from the radio device 34 and other radio devices. In this manner, during the operation of the radio device 34, the radio device 34 may be provided with current information regarding channel availability and quality. The revised scored channel map may be received by the radio device in block 54. The revision to the channel map may be made on a periodic basis or may be triggered by an event (e.g., detection of new incumbent radio system in the location of the radio device 34 or change in quality as identified from feedback information).

In block 56, the radio device 34 may make a determination as to whether to change operational channels based on the revised channel map that is received in block 54. In one embodiment, the channel may be changed if the revised channel map contains a channel with a higher score than the currently selected channel. In this case, the logical flow may return to block 48 to select the new channel. Otherwise, the logical flow may return to block 50 to continue operations on the currently selected channel.

D. CONCLUSION

Although certain embodiments have been shown and described, it is understood that equivalents and modifications falling within the scope of the appended claims will occur to others who are skilled in the art upon the reading and understanding of this specification.

What is claimed is:

1. A system for providing channel maps of available spectrum to radio devices, comprising:
    an interface to communicate with the radio devices over a network; and
    a processor that executes a spectrum resource function that is stored in a memory and, by execution of the spectrum resource function, the system configured to:
        receive a request message from a requesting one of the radio devices;
        determine channels that are available for use by the requesting radio device;
        score each determined channel as a weighted combination of factors, the relative weights for each factor determined for the requesting radio device to account for at least one of susceptibility to different types of interference or tolerance of the different types of interference in the weighted combination; and
        transmit the determined channels and corresponding scores to the requesting radio device.

2. The system of claim 1, wherein the channels that are available for use by the requesting radio device are determined by applying policies that govern use of spectrum by the requesting radio device.

3. The system of claim 1, wherein the factors are quantified based on feedback from the radio devices.

4. The system of claim 3, wherein each radio system that receives a channel map from the system is required to provide feedback to the system.

5. The system of claim 3, wherein the feedback includes at least one of channel selection, noise floor measurement, channel metrics, or radio signal detection.

6. The system of claim 1, wherein each factor is quantified and scaled to a common scale.

7. The system of claim 6, wherein the factors are combined as a weighted sum.

8. The system of claim 1, wherein the factors include noise floor, proximity and congestion.

9. The system of claim 8, wherein proximity is determined using a path loss model and is specified as an interference amount based on radio signal power level from radio systems other than the requesting radio device.

10. The system of claim 1, wherein the request message is a whitespace registration request.

11. A method of providing channel maps of available spectrum to radio devices, comprising:
    receiving a request message from a requesting one of the radio devices;
    determining channels that are available for use by the requesting radio device;
    scoring each determined channel as a weighted combination of factors, the relative weights for each factor determined for the requesting radio device to account for at least one of susceptibility to different types of interference or tolerance of the different types of interference in the weighted combination; and
    transmitting the determined channels and corresponding scores to the requesting radio device.

12. The method of claim 11, wherein the channels that are available for use by the requesting radio device are determined by applying policies that govern use of spectrum by the requesting radio device.

13. The method of claim 11, wherein the factors are quantified based on feedback from the radio devices.

14. The method of claim 13, wherein each radio system that is configured to receive a channel map from a system that generates the channel map is required to provide feedback to the system.

15. The method of claim 13, wherein the feedback includes at least one of channel selection, noise floor measurement, channel metrics, or radio signal detection.

16. The method of claim 11, wherein each factor is quantified and scaled to a common scale.

17. The method of claim 16, wherein the factors are combined as a weighted sum.

18. The method of claim 11, wherein the factors include noise floor, proximity and congestion.

19. The method of claim 18, wherein proximity is determined using a path loss model and is specified as an interference amount based on radio signal power level from radio systems other than the requesting radio device.

20. The method of claim 11, wherein the request message is a whitespace registration request.

* * * * *